Figure 1:
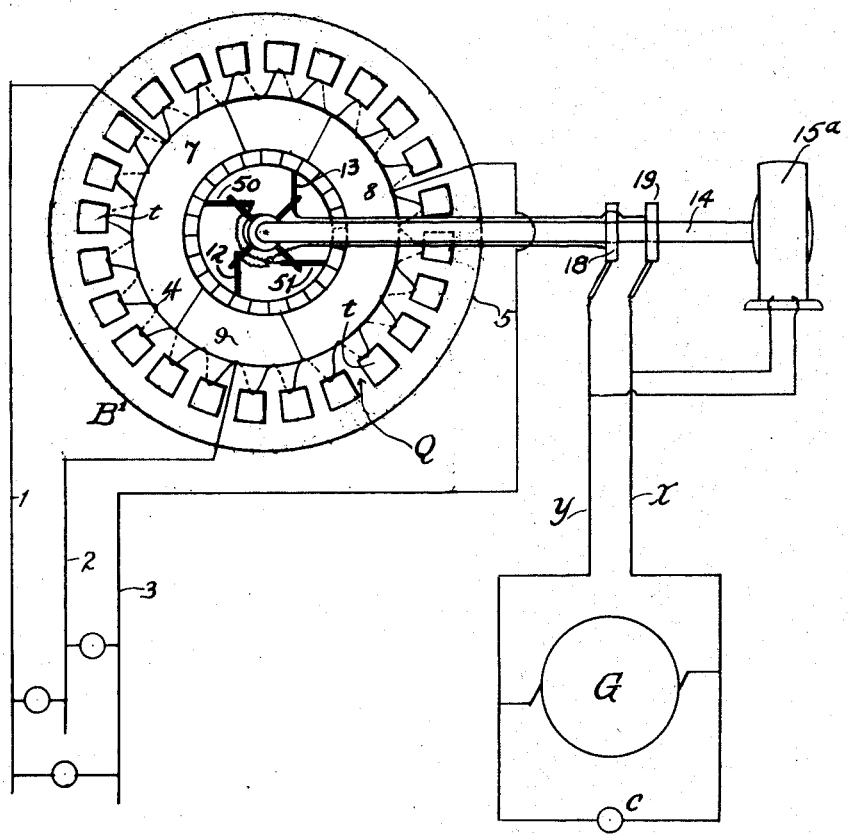

No. 880,705. PATENTED MAR. 3, 1908.
J. L. WOODBRIDGE.
SYSTEM OF ELECTRICAL DISTRIBUTION.
APPLICATION FILED AUG. 30, 1905.

2 SHEETS—SHEET 1.

WITNESSES:

INVENTOR
Joseph L. Woodbridge.
BY
ATTORNEY.

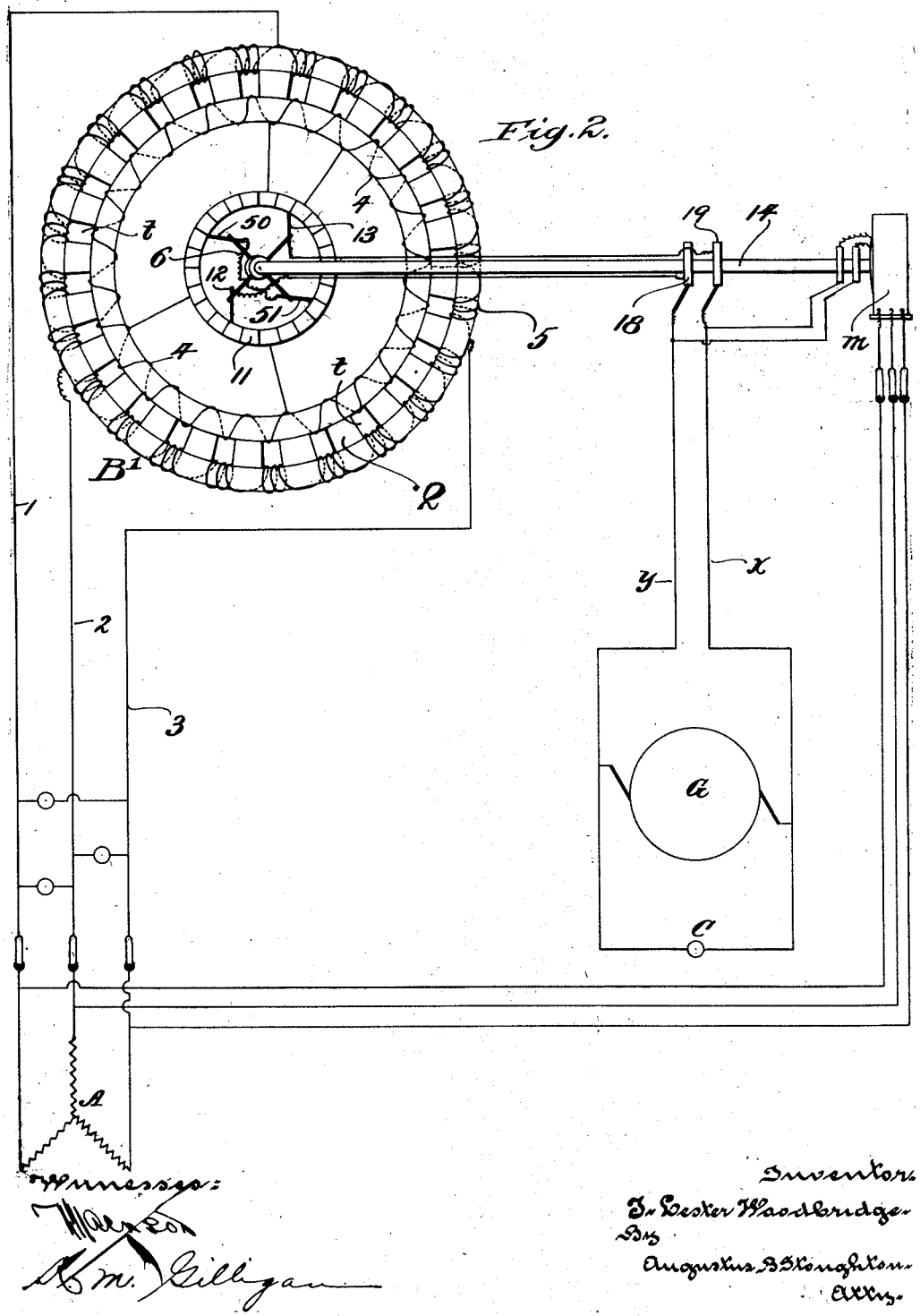

UNITED STATES PATENT OFFICE.

JOSEPH LESTER WOODBRIDGE, OF PHILADELPHIA, PENNSYLVANIA.

SYSTEM OF ELECTRICAL DISTRIBUTION.

No. 880,705.  Specification of Letters Patent.  Patented March 3, 1908.

Application filed August 30, 1905. Serial No. 276,351.

*To all whom it may concern:*

Be it known that I, JOSEPH LESTER WOODBRIDGE, a citizen of the United States, residing at Philadelphia, in the county of Philadelphia and State of Pennsylvania, have invented a certain new and useful System of Electrical Distribution, of which the following is a specification.

My invention relates to those systems of electrical generation and distribution in which both direct and alternating currents are employed, and its principal object is to provide simple and efficient means for converting either form of electrical energy into the other and for controlling their relations.

To these and other ends hereinafter set forth the invention comprises the improvements to be presently described and finally claimed.

The nature, characteristic features and scope of my invention will be more fully understood from the following description taken in connection with the accompanying drawings forming part hereof and in which Figure 1 represents apparatus embodying features of the invention adapted to transform energy from direct to alternating current, while Fig. 2, illustrates similar apparatus arranged to transfer energy in either direction between an alternating current and a direct current circuit.

In Fig. 1, alternating current is taken from the same winding to which the commutator and direct current brushes are connected, while in Fig. 2, two windings in inductive relation, are shown. When operating in parallel with an alternating current source, as in Fig. 2, the revolving brushes must be driven by a synchronous motor. This motor as shown, is of the revolving field type, current for field excitation being taken from the circuit X Y and delivered to the field windings by collector rings on the shaft 14, in the usual manner. With a direct current source only, as in Fig. 1, a direct current motor must be used.

In the drawings G, is a source of direct current electrical energy, as for example a direct current generator, to whose terminals are connected respectively the conductors $x, y$.

B¹, is a piece of apparatus embodying features of the invention analogous to a transformer or converter. This piece of apparatus will now be described in connection with the drawing.

Q, is a magnetic circuit shown in the drawings as a circular rim provided with openings $t$, to receive windings.

4, is a winding embracing the inner portion of the rim Q, and connected to a commutator 11, in the usual manner. For simplicity only a few of the connections from this winding to its commutator are shown. To this winding in Fig. 1 are connected at points 7, 9 and 8, respectively the three conductors 1, 2, 3, which constitute the alternating current consumption circuit.

In Fig. 2, a second winding 5, is shown, embracing the outer portion of the rim, to which the alternating current circuit 1, 2, 3, is connected, instead of to the winding 4.

The magnetic circuit Q, with its windings and the commutator are all stationary.

Bearing on the commutator are two pairs of brushes, 12, 13, and 50 and 51, which are carried on a shaft 14, concentric with the commutator and arranged to be driven as by the direct current motor 15ª in Fig. 1, or the synchronous motor $m$ in Fig. 2. This motor as shown is of the revolving field type, current for field excitation being taken from the circuit $x\ y$ and delivered to the field windings by collector rings on the shaft 14 in the usual manner.

The brushes 12 and 13 are insulated from the shaft 14, but are connected respectively to collector rings 18 and 19 carried on said shaft. To these collector rings the circuit $x\ y$ is connected by suitable brushes.

The brushes 50 and 51 bear upon the commutator 11, at points 90° from the brushes 12, and 13. These brushes 50 and 51 are also insulated from the shaft 14, but are electrically connected to each other by a conductor of low resistance 6, *i.e.* short circuited.

The operation of this apparatus is as follows: The shaft 14 is rotated by the motor 15ª, in Fig. 1, or the motor $m$, in Fig. 2 thereby driving the brushes 12, 13, 50 and 51 around the commutator 11. Connection is made between the direct current circuit $x\ y$ and the collector rings 18 and 19, thus applying a direct current electro-motive force to the brushes 12 and 13. The tendency of this direct current electro-motive force will be to send current through the winding 4, between the brushes 12 and 13, and if not opposed by a suitable counter electro-motive force, this current would be excessive. Such a counter electro-motive-force will, however, be produced by means of the short circuited brushes 50 and 51, in the following manner: As soon as the direct current electro-motive-force is applied to the brushes 12 and 13 a small amount of current will flow through the winding 4 between the brushes 12 and 13, producing in the rim Q, a small magnetic field in a direction corresponding with the line of contact of said brushes and rotating with them. This field by its rotation will produce a small electro-motive force at right angles to itself, and therefore at the short circuited brushes 50 and 51. This electro-motive force will send current of considerable magnitude between these short circuited brushes and in the winding 4, creating a strong magnetic field in a direction corresponding with the line of contact of the brushes 50 and 51, and this field will in turn, create the necessary counter-electro-motive-force between the brushes 12 and 13, thus preventing the flow of any more current between these brushes 12 and 13 than is necessary to maintain the field strength and the counter electro-motive-force as above described. The rotating field will now produce an alternating electro-motive force in the winding 4, of Fig. 1, or in both windings of Fig. 2, from which alternating current may then be taken by the consumption circuit 1, 2, and 3.

In Fig. 2 A, is a source of three phase alternating electro-motive force connected to the consumption circuit which may supply a portion of the energy demanded. Or it may supply the entire alternating current load and in addition reverse the operation of the transformer B causing it to convert alternating current into direct current for supplying the demand on the direct current working circuit as at C.

To summarize it will be observed from the above description that the converting apparatus shown in the drawings consists essentially of a magnetic circuit provided with windings and a commutator, upon which commutator bear two pair of brushes displaced at an angle of 90°, each pair connected by an independent conducting circuit with means for producing relative rotation of brushes and commutator, and further that whenever a flow of alternating current is induced by whatever cause, in the windings, in proper phase relation to one pair of brushes, the resulting flow of current between this pair will by its effect on the magnetic circuit, cause a flow of direct current between the other pair of brushes, and this latter flow will be approximately proportional to the flow of alternating current first mentioned. Or, if a flow of direct current is induced between one pair of brushes, such flow will, by its effect on the magnetic circuit, cause a flow of direct current between the other pair of brushes, and this latter flow by its effect on the magnetic circuit, will produce an alternating electro-motive force in the windings and a flow of alternating current from the latter if connected to a suitable alternating current circuit. Furthermore, it is an inherent characteristic of the converting apparatus herein described that when used to produce in a circuit connecting one pair of brushes a flow of direct current corresponding to a flow of alternating current in the windings, the flow of direct current may be made proportional to any particular phase component of the alternating current by the proper adjustment of the brushes with reference to the phase relation of the synchronous motor; that is, the adjustment may be such that the direct current will be proportional to the energy component or to the wattless component of the alternating current, or to any other component intermediate in phase relation.

It will be obvious to those skilled in the art to which the invention relates that modifications may be made in details without departing from the spirit thereof, hence the invention is not limited further than the prior state of the art may require, but

Having thus described the nature and objects of my invention what I claim as new and desire to secure by Letters Patent is

1. In combination a magnetic circuit of which all parts are relatively fixed, a winding in inductive relation thereto, a commutator connected to said winding, one set of brushes for said commutator adapted for connection to a direct current circuit, another set of brushes electrically interconnected and adapted to produce a displaced magnetic field in said magnetic circuit, and means for producing relative rotation of brushes and commutator.

2. In combination a magnetic circuit of which all parts are relatively fixed, a winding in inductive relation thereto, a commutator connected to said winding, brushes for said commutator adapted for connection to a direct current circuit and direct current means for producing a rotating magnetic field in said magnetic circuit, displaced with respect to the point of contact of said brushes.

3. In combination a magnetic circuit all parts of which are relatively fixed, a winding in inductive relation thereto, alternating current connections for said winding, and direct current means for producing in said magnetic circuit a rotating magnetic field, said means including a commutator and brushes of which some are adapted for connection to a source of direct current electro-motive-force, while others are displaced with respect to the first and short circuited.

4. In combination a magnetic circuit of which all parts are relatively fixed, a winding in inductive relation thereto, a commutator connected to said winding, brushes for said commutator adapted for connection to a source of direct current electro-motive-force, and direct current means for producing in the winding an electro-motive-force counter to that of the source.

5. In combination a magnetic circuit, of which all parts are relatively fixed, a winding in inductive relation thereto, a commutator connected to said winding, and commutator brushes whereof some are short circuited and others are adapted for connection to direct current lines.

6. In combination a winding, alternating current connections thereto, and direct current means for producing therein a rotating magnetic field, said means including a commutator and brushes of which some are adapted for connection to a source of direct current electro-motive-force while others are displaced with respect to the first and short circuited.

7. In combination a winding provided with a commutator, a second winding in inductive relation to the first winding and provided with alternating current connections, commutator brushes whereof some are short circuited and others are adapted for connection to direct current lines, and means for producing rotation between the brushes and commutator, substantially as described.

8. In apparatus for the inductive transformation of electrical energy from one form to another, the combination with a direct current source of a plurality of conducting coils in inductive relation, a commutator connected to some of said coils, a set of brushes for said commutator arranged to permit current to flow from the source through the coils to establish a magnetic field within said coils, means for producing relative motion between brushes and commutator to rotate said field with respect to said coils, and means including a second set of brushes electrically interconnected and maintained at an angular displacement from the first set and arranged to permit a flow of current caused by the electro-motive-force developed by the rotation of said field and thereby produce a second rotating field within said coils and a counter-electro-motive-force opposed to that of the source.

9. In combination a winding on a magnetic circuit, a commutator connected to said winding, a set of brushes bearing on the commutator, a source of direct current electro-motive-force connected to the brushes, means for producing relative rotation of commutator and brushes, and means dependent upon the magnetic flux produced by the flow of current from the source through the winding including a second set of electrically interconnected brushes maintained at an angular displacement from the first set for producing in the winding a second relatively rotating magnetic flux and an electro-motive-force counter to that of the source.

10. In combination a winding on a magnetic circuit, a commutator connected to said winding, a set of brushes bearing on the commutator, a source of direct current electro-motive-force connected to the brushes, means for producing relative rotation of commutator and brushes, means dependent upon the magnetic flux produced by the flow of current from the source through the winding including a second set of electrically interconnected brushes maintained at an angular displacement from the first set for producing in the winding a second relatively rotating magnetic flux and an electro-motive-force counter to that of the source, and means for deriving from the inductive effect of one of the relatively rotating magnetic fluxes electrical energy in a different form from that supplied by the source.

11. In combination a magnetic circuit all parts of which are relatively fixed, a plurality of conducting coils in inductive relation to said magnetic circuit, alternating current connections to some of said coils, a commutator connected to some of said coils, two sets of brushes for said commutator, means for connecting the opposite brushes of one set to an electrical circuit, an independent electrical circuit connecting the opposite brushes of the other set, and means for producing relative rotation of commutator and brushes.

12. In combination a magnetic circuit, conducting coils in inductive relation to said circuit, a commutator connected to some of said coils, means for inducing a flow of alternating current through some of said coils, two sets of brushes for said commutator electrically displaced from each other, each set electrically interconnected by an independent circuit, and means for producing relative rotation of commutator and brushes.

In testimony whereof I have hereunto signed my name.

JOSEPH LESTER WOODBRIDGE.

Witnesses:
K. M. GILLIGAN,
S. E. PATTERSON.